(12) United States Patent
Goderer et al.

(10) Patent No.: US 9,945,964 B2
(45) Date of Patent: Apr. 17, 2018

(54) EVALUATION LOGIC OF AN X-RAY DETECTOR WITH MULTI-LEVEL MULTIPLEXER

(71) Applicant: Siemens Healthcare GmbH, Erlangen (DE)

(72) Inventors: Edgar Goderer, Forchheim (DE); Michael Hosemann, Erlangen (DE); Thomas Suttorp, Munich (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 84 days.

(21) Appl. No.: 15/214,492

(22) Filed: Jul. 20, 2016

(65) Prior Publication Data

US 2017/0038479 A1 Feb. 9, 2017

(30) Foreign Application Priority Data

Aug. 7, 2015 (DE) .................. 10 2015 215 086

(51) Int. Cl.
*G01T 1/24* (2006.01)
(52) U.S. Cl.
CPC .................... *G01T 1/247* (2013.01)
(58) Field of Classification Search
CPC ............ G01T 1/247; H05G 1/64; H03K 3/00
See application file for complete search history.

(56) References Cited

U.S. PATENT DOCUMENTS

| | | | |
|---|---|---|---|
| 2002/0092969 A1* | 7/2002 | Iodice .................. | H04N 3/1575 250/208.1 |
| 2010/0172466 A1 | 7/2010 | Herrmann et al. | |
| 2010/0296627 A1* | 11/2010 | Inoue .................... | G01T 1/2928 378/62 |
| 2012/0194250 A1* | 8/2012 | Dvorak ................ | H03K 17/005 327/298 |
| 2014/0264060 A1 | 9/2014 | Kameshima et al. | |
| 2016/0284748 A1* | 9/2016 | Mruthyunjaya ......... | H04N 5/32 |
| 2017/0090048 A1* | 3/2017 | Groepl .................... | G01T 1/247 |

* cited by examiner

*Primary Examiner* — Casey Bryant
(74) *Attorney, Agent, or Firm* — Harness, Dickey & Pierce, P.L.C.

(57) ABSTRACT

An X-ray detector includes an arrangement of detector elements and an evaluation logic of the arrangement of detector elements. The evaluation logic includes a multi-level first multiplexer. A plurality of detector elements are assigned to a first group and each detector element of the first group is assigned to an input of a first level of the multi-level first multiplexer. The respective total number of the inputs of the levels of the multi-level first multiplexer is greater than the total number of outputs of the levels of the multi-level first multiplexer. A serial output is assigned to an output of a last level of the multi-level first multiplexer.

26 Claims, 7 Drawing Sheets

EVALUATION LOGIC OF AN X-RAY DETECTOR WITH MULTI-LEVEL MULTIPLEXER

PRIORITY STATEMENT

The present application hereby claims priority under 35 U.S.C. § 119 to German patent application number DE 102015215086.0 filed Aug. 7, 2015, the entire contents of which are hereby incorporated herein by reference.

FIELD

At least one embodiment of the invention generally relates to an X-ray detector and/or a medical apparatus.

BACKGROUND

X-ray detectors are used in different areas of medical imaging, for example in computed tomography, angiography or radiography. X-ray photons can be detected, for example, in the energy range from 5 keV to 1 MeV. A preferred energy range is 20 keV to 200 keV, which is advantageous in medical imaging. Apart from X-ray radiation, gamma radiation can also be detected.

The X-ray detector can convert the X-ray radiation into an electrical signal or an electrical pulse with the aid of a converter material. The conversion can take place via direct or indirect converter materials. Preferably, direct converter materials are used, for example CdTe, CZT, and other converter materials comprising Cd, GaAs or Si. The conversion of the energy of the X-ray photons deposited in the converter material can lead to the triggering of electron-hole pairs. A charge or a current can be measured as the signal. Furthermore, for example, amorphous selenium can be used as a photoconductor or a converter material.

In counting X-ray detectors, the electrical pulses are amplified in an integrated circuit or ASIC (Application Specific Integrated Circuit). The amplified pulse is compared in one or more discriminators with an energy threshold. On use, for example, of a one-sided discriminator, the pulse is registered as an event. The number of registered events is a count value. In particular for uses with high photon fluxes, for example, in computed tomography, many bits are involved during the readout of the count values. For each detector element, the number of bits represents the summand of the number of energy thresholds or discriminators and the length of the counter.

Conventionally, the count values of an arrangement of detector elements are read out via shift registers column by column or for the whole arrangement to a serial or parallel output. Alternatively, buses can be used for specifically addressing and reading out individual pixels. Alternatively, detector elements which have a count value of greater than zero can be read out whilst other detector elements with count values equal to zero are not read out. For uses with high photon fluxes, for example, in computed tomography, these methods are not suitable or only to a very limited extent. When shift registers are used for reading out columns or whole arrays of detector elements, a large number of simultaneously switching flip-flops is used. These flip-flops must be operated for a short readout time with a high frequency. The high frequency leads to a high power loss. In addition, the crosstalk can be increased. On use of buses, powerful drivers are needed in order to recharge high parasitic loads of the bus lines rapidly. The use of powerful drivers can lead to a high power loss.

In computed tomography, the X-ray detector is continuously irradiated during a scan or a recording. It is desirable to record the successive images or scans as far as possible without interruption. The readout of the count values should therefore take place during the recording.

SUMMARY

The inventors have discovered that a high level of activity in the digital front end of the integrated circuit can interfere with the sensitive analog signals in the analog front end of the integrated circuit. An interference of the analog signals can lead to a worsening of the response of the X-ray detector, for example, regarding the energy triggering.

The inventors have discovered that a further problem can be the number of data lines or signal lines between the integrated circuit and a further readout electronic system, for example, a readout electronic system for a module having a plurality of X-ray detectors. Due to a high number of X-ray detectors or integrated circuits per module, the number of data lines should be as small as possible in order to simplify the complexity and space requirements of the data lines or plug-in connections. In the case of X-ray detectors and modules which can be tiled on a plurality of sides, the cooling of the sensor is preferably carried out via the side facing away from the X-ray source. The cooling and the electrical connection of the integrated circuits to a further evaluation electronic system take place adjoining one another at the side facing away from the X-ray source. A high number of data lines impedes the cooling of the sensor. Particularly in computed tomography, X-ray detectors and modules which can be tiled are used.

Embodiments of the present application include an X-ray detector and a medical apparatus which enable efficient readout, a reduction in crosstalk, a reduced number of data lines for further evaluation electronics and an adaptation of the data volume.

At least one embodiment of the invention relates to an X-ray detector which has an arrangement of detector elements and an evaluation logic of the arrangement of detector elements. The evaluation logic comprises a multi-level first multiplexer. A plurality of detector elements are assigned to a first group. Each detector element of the first group is assigned to an input of a first level of the multi-level first multiplexer. The respective total number of inputs of the levels of the multi-level first multiplexer is greater than the total number of outputs of the levels of the multi-level first multiplexer. A serial output is assigned to an output of a last level of the multi-level first multiplexer.

At least one embodiment of the invention further relates to a medical apparatus comprising an X-ray detector of an embodiment.

BRIEF DESCRIPTION OF THE DRAWINGS

Example embodiments of the invention will now be described in more detail, making reference to the drawings. In the drawings.

DETAILED DESCRIPTION OF THE EXAMPLE EMBODIMENTS

Figure 1:
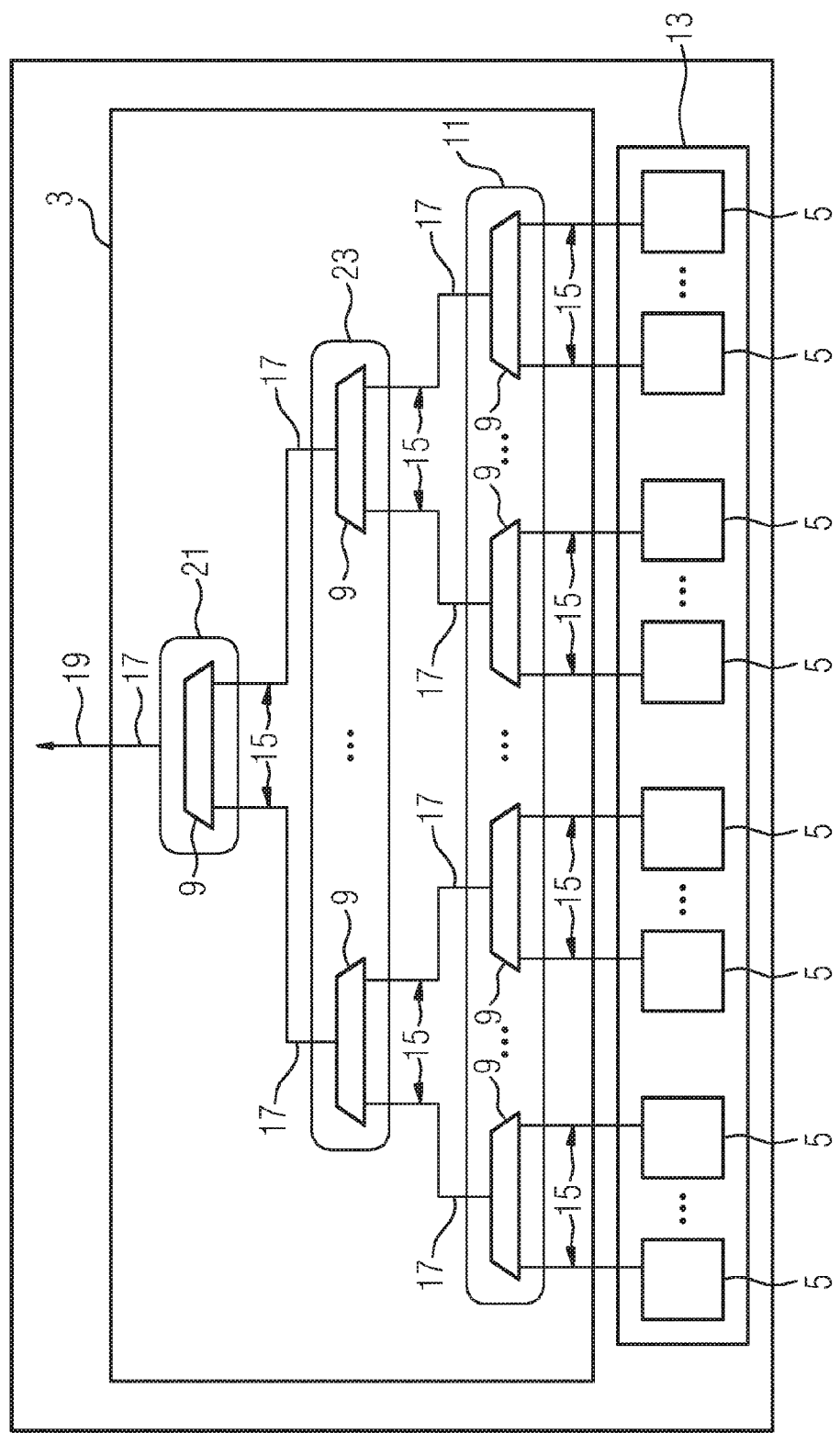
FIG. 1 is a schematic representation of a concept for an X-ray detector according to a first embodiment with a multi-level first multiplexer.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to an X-ray detector which has an arrangement of detector elements and an evaluation logic of the arrangement of detector elements. The evaluation logic comprises a multi-level first multiplexer. A plurality of detector elements are assigned to a first group. Each detector element of the first group is assigned to an input of a first level of the multi-level first multiplexer. The respective total number of inputs of the levels of the multi-level first multiplexer is greater than the total number of outputs of the levels of the multi-level first multiplexer. A serial output is assigned to an output of a last level of the multi-level first multiplexer.

The X-ray detector can comprise a plurality of detector elements. The detector elements can be present in a two-dimensional array, for example grid-like with rows and columns. The detector elements can be square or rectangular.

The detector elements have a sensitive volume in the converter material and the sensitive volume can be electrically conductively connected, for example, by way of solder joints to a region of the evaluation logic which processes the signal from the sensitive volume.

The evaluation logic can read out the signals, evaluate them, consolidate them or, for example, make them available to other external evaluation units. In particular, the signals of the individual detector elements can be read out and the signals of all the detector elements can be consolidated as one data stream. The evaluation logic can be contained within an integrated circuit (ASIC, Application Specific Integrated Circuit). The evaluation logic can comprise an analog front-end and a digital front-end. The analog front-end can amplify, form and discriminate the signal from the sensitive volume of the converter material. The signal can be digitized and further processed in the digital front-end. The digital front-end can comprise a readout architecture which further processes the signals of all the detector elements, consolidates them or passes them to an output.

The readout architecture of the evaluation logic can comprise a multi-level first multiplexer. The first multi-level multiplexer can be distributed over the entire area of the X-ray detector. The multi-level first multiplexer can represent a hierarchical description of the arrangement of the detector elements. The levels of the multi-level first multiplexer can be assigned to hierarchy levels of the arrangement of the detector elements, for example, in each case a level of the multiplexer can be assigned to a serial output, the quadrants, columns of a quadrant, rows of a quadrant or the individual detector elements. Each level contains at least one multiplexer unit. The detector elements can be configured as macropixels with a plurality of subpixels or as subpixels. The number of levels can be, for example, in the range from 2 to 10. Preferably, the multi-level first multiplexer has at least 3 levels and not more than 6 levels. Each level of the multi-level first multiplexer has at least one multiplexer unit.

A plurality of detector elements are assigned to a first group. The first group describes, for example, a lowest hierarchy level of the arrangement of detector elements. The first group can be, for example, the set of all subpixels or the set of all columns of subpixels in the macropixels or the set of all macropixels or the set of all columns of macropixels in a quadrant as a detector element. Each detector element of the first group is assigned to an input of a first level of the multi-level first multiplexer. The first level can form the lowest hierarchy level. The set can be subdivided into subsets which are preferably equally large, for example into subsets with 4 elements, for example, macropixels, subpixels or columns of subpixels in macropixels. Each subset is assigned to a multiplexer unit of the first level. Each element is assigned to an input of the multiplexer unit of the multi-level multiplexer. The largest number of inputs is assigned to the first level. An output can be assigned to each multiplexer unit of the multi-level first multiplexer. Each multiplexer unit can comprise, for example, 4 inputs and one output. The number of signal lines can be reduced accordingly by a factor of 4.

The further levels of the multi-level first multiplexer can comprise a reduced total number of the inputs of the levels of the multi-level first multiplexer and a reduced total number of the outputs of the levels of the multi-level first multiplexer as compared with the previous level of the multi-level first multiplexer. With each further level of the multi-level first multiplexer, the hierarchy level of the arrangement of the detector elements increases, for example, from macropixels to columns of macropixels, from columns of macropixels to quadrants or from quadrants to a serial output. The levels of the multi-level first multiplexer can have a tree-like or hierarchical structure. The hierarchically lowest level or the leaves of a tree are assigned to the first level of the multi-level first multiplexer. Each further level leads to a hierarchically higher level or coarser branching. The last level of the multi-level first multiplexer is assigned to the serial output. The last level represents the highest hierarchical level or the trunk of the tree. In a further embodiment, the last level can be assigned to a plurality of serial outputs.

By way of the readout architecture of the evaluation logic with the multi-level first multiplexer, the speed of the switching or the clock rate to lower levels of the multi-level first multiplexer can advantageously be reduced. The serial output is operated at the full clock rate. The clock rate of the lower hierarchy levels of the multi-level first multiplexer can be reduced, for example, by assigning the levels to quadrants, macropixel columns, macropixels or columns of subpixels in macropixels, respectively with the number of quadrants, macropixel columns, macropixels or columns of subpixels in macropixels. A single clock rate can be distributed to all levels of the multi-level first multiplexer, wherein the single clock rate in the levels can be reduced, for example, by multipliers close to the multiplexer units. Clock rates adapted to each level of the multi-level first multiplexer can be distributed, wherein the adapted clock rate is provided, for example, at one site and is distributed from there. Advantageously, the power loss can be reduced. Advantageously, the crosstalk due to the readout process as a result of the low clock frequency in the hierarchically lower levels can be reduced or avoided. Advantageously, fewer or weaker drivers can be used for transporting the data via the integrated circuit to the serial output. The readout architecture is particularly energy and space efficient. The crosstalk of digital signals onto the analog front end of the readout logic is reduced.

At least one embodiment of the invention further relates to a medical apparatus comprising an X-ray detector of an embodiment.

The medical apparatus can be, for example, a radiography apparatus, an angiography apparatus or preferably a computed tomography apparatus. The advantages of the X-ray detector according to the invention can be transferred to the medical apparatus. The reduced power loss, the reduced clock rate in the low hierarchy levels of the multi-level first multiplexer and the reduced crosstalk can advantageously bring about a reduced power consumption of the X-ray detector and an improved spatial or energy resolution of the medical apparatus.

According to one embodiment of the invention, the detector element is configured to carry out energy-selective measurements.

The detector element can carry out energy-selective measurements via different discriminators, thresholds or energy channels. The discriminators can be constructed one-sided or two-sided. The macropixels or subpixels can comprise a plurality of discriminators.

Spectral information can also be obtained from macropixels or subpixels and can advantageously be used for assessing the examination object, for example, for determining the materials present in the examination object.

According to one embodiment of the invention, the detector element is a subpixel of a macropixel.

The detector element can be configured as a subpixel of a macropixel. The macropixel can be subdivided, for example, into quadrants or columns and the quadrants or columns contain a plurality of subpixels. A macropixel can comprise, for example, an arrangement of 2×2 subpixels, 3×3 subpixels, 3×4 subpixels, 4×4 subpixels or 6×4 subpixels.

The subpixels can comprise a plurality of discriminators. The first level of the multi-level first multiplexer can be assigned to the discriminators or energy channels of the subpixel. The serial output can be assigned as an output of the last level. The multi-level first multiplexer can preferably have 5 or 6 levels. Advantageously, a further reduction in the power loss, the clock rate and the crosstalk can be achieved.

According to one embodiment of the invention, the detector element is a macropixel which has a plurality of subpixels.

The first level of the multi-level first multiplexer can be assigned to a column of the quadrant with a plurality of macropixels. The multi-level first multiplexer can preferably have 3 levels. Advantageously, the multi-level first multiplexer can be combined with other architectures for the readout on the level of the subpixel.

Different operating modes of the X-ray detector can be provided, in particular for the configuration of the evaluation logic in the macropixels, shift registers, multi-level first multiplexers or multiplexer-adder levels can be used. Flexible summation modes with regard to spatial and energy resolution can also be realized as well as rapid and slow operating modes.

According to one embodiment of the invention, a plurality of the subpixels of the macropixel are assigned to a second group. The X-ray detector also has a shift register for the readout of the second group of subpixels.

Within a macropixel, the subpixels can be assigned to a second group. Each subpixel of the second group can be assigned to an input of a shift register. For example, a shift register or a group of shift registers per column of subpixels can be used. In the case of subpixels with a plurality of discriminators, the counters connected downstream of the discriminators can each be assigned to a shift register and for each column of subpixels, a group of shift registers can be used. The counters can be connected to the energetically identical channels of the subpixels by way of a shift register. The counter values of the subpixels or energy channels are transported to a first macropixel multiplexer. The first macropixel multiplexer can process all the bits of one energy channel with the aid of a macropixel control logic system before the bits of the next energy channel are processed. The outputs of the first macropixel multiplexers can be connected to the inputs of a second macropixel multiplexer. The energy channels can be selected with the aid of the macropixel control logic. Energy channels can also be ignored. The first macropixel multiplexer and second macropixel multiplexer augments the readout architecture further with flexibility and advantageously reduces crosstalk and power loss. In the serial output data stream, the bits of different energy channels are separated. By this, in selected modes of the X-ray detector, the readout of one or more energy channels can be dispensed with, so that the data volume is advantageously reduced. Due to the targeted selection of energy channels, shorter readout intervals or a reduction in the readout rate can lead to an advantageous reduction in the power or to a reduced crosstalk.

Advantageously, through the combination of a shift register with a first or second macropixel multiplexer or a multi-level first multiplexer, a reduced complexity and a reduction in the clock rate can be achieved.

According to one embodiment of the invention, the macropixel comprises at least one multiplexer-adder level.

The multiplexer-adder level can be a combination of multiplexer units and full adders. The multiplexer-adder level can comprise a plurality of inputs and one output. The features of a multiplexer unit and the features of a full adder can be combined in order, advantageously, to realize different modes of the X-ray detector. Advantageously, a reduction in the crosstalk, the power consumption, the clock rate or the data volume can be achieved. The complexity of the subsequent readout architecture can advantageously be reduced. Advantageously, a power saving, reduced crosstalk, shorter readout times and a flexible compression or pre-processing of the signals can be achieved.

According to one embodiment of the invention, the multiplexer-adder level comprises an input multiplexer, an adder level and an output multiplexer.

The input multiplexer can comprise a plurality of inputs, for example 4 inputs and one output. The data streams of the inputs are emitted as one data stream by the output.

The adder level can comprise a plurality of inputs, for example 4 inputs and one output. The data streams of the inputs are emitted as one data stream by the output.

The adder level can comprise one or more full adders with carry. Incoming bit streams or data streams can be added bit-by-bit. The result can be output to the subsequent level with the aid of the output multiplexer, for example, a further multiplexer-adder level or as the input into the multi-level first multiplexer.

The input multiplexer and the adder level can be operated in parallel and can comprise the same data streams as the input. The output multiplexer can output the data streams of the input multiplexer or the adder level.

Advantageously, the multiplexer-adder level can be spatially distributed and it enables a flexible readout of the data of the subpixels, for example, of added signals of a plurality of subpixels or the signals of individual subpixels. The adder level advantageously enables a selectable data reduction. Advantageously, the output efficiency can be improved and the crosstalk and the minimum achievable readout time can be reduced. The multiplexer-adder level enhances the readout logic with high flexibility and efficiency at the level of the macropixel and the subpixel. Advantageously, a targeted adaptation to the spatial resolution desired for a diagnostic purpose, the number of the discriminators or energy channels and the measurement duration can be achieved.

According to one embodiment of the invention, the adder level comprises two tiers.

The multiplexer-adder level can have a hierarchical structure. The output of the input multiplexer and the output of the adder level can be assigned to an input of the output multiplexer. The adder level can comprise two hierarchy levels, wherein the inputs of the adder level can be distributed over two full adders with carry and the outputs of the two full adders with carry can be the inputs of a further full adder with carry. The two full adders with carry form the first tier. The further full adder with carry forms the second tier. Between the first tier and the second tier, the signals of the outputs of the two full adders with carry can be branched off and further used differently. Advantageously, the components of the multiplexer-adder level can be arranged distributed over the surface of the macropixel.

Advantageously, a flexible addition of signals can be carried out and the signals of the outputs of the two full adders with carry or of the further full adder with carry can be flexibly further used.

According to one embodiment of the invention, a plurality of the subpixels of the macropixel are assigned to a second group. Each subpixel of the second group is assigned to an input of the input multiplexer or an input of the adder level.

Within a macropixel, the subpixels can be assigned to a second group. Each subpixel of the second group can be assigned to an input of the input multiplexer or to an input of the adder level. The set of all subpixels of a macropixel can be divided into subsets which are preferably equally large, for example into sets with 4 elements, for example, subpixels or energy channels of the subpixels of a column of the macropixel. Each subset is assigned to a multiplexer-adder level within the macropixel. Each element is assigned to an input of a multiplexer-adder level within the macropixel. Each multiplexer-adder level within the macropixel can be assigned to an output. Each multiplexer-adder level can comprise, for example, 4 inputs and one output. The number of signal lines can advantageously be reduced by a factor of 4.

According to one embodiment of the invention, the output of the input multiplexer or the output of the adder level can be assigned to the output multiplexer.

The output multiplexer has a first input which is connected to the output of the input multiplexer, and the output multiplexer has a second input which is connected to the output of the adder level. The output multiplexer can output the signals of the first input or of the second input, for example as a combination. The signals, for example, of the subpixels or of regions of the macropixel can advantageously be read out and added flexibly.

According to one embodiment of the invention, the output of a multiplexer-adder level is assigned to an input of a further input multiplexer or an input of a further adder level.

The multiplexer-adder level can adjoin a further multiplexer-adder level. The further multiplexer-adder level comprises a further input multiplexer and a further adder level. The output of the multiplexer-adder level can be assigned to an input of the further multiplexer-adder level, to the further input multiplexer or to the further adder level. Advantageously, the signals of the subpixels can be combined with one another within a macropixel. Advantageously, a reduction can be achieved in the data volume, the crosstalk or the power loss.

According to one embodiment of the invention, the adder level comprises a sum memory which is assigned to the input of the further input multiplexer, the input of the further adder level or the output multiplexer.

The adder level can comprise a sum memory which can serve as an intermediate memory store for a calculated sum.

The input of the sum memory is connected to the output of the further full adder with carry. The output of the sum memory is connected to the input of the output multiplexer. Advantageously, the signals can be added together with the aid of the input multiplexer to a signal with full information of the count values of the subpixels, whereas the total of the counting values can be calculated and stored. The stored total can, for example, be added to the data stream with full information regarding the count values of the subpixels. Advantageously, the entire information of the count values of the subpixels and the calculated total are available for the evaluation of the signals. The data stream can contain the count values of the subpixels and the total of count values. Advantageously, the calculated totals of count values can be used for a rapid real time reconstruction. The count values of the subpixels can advantageously be used for a detailed reconstruction.

According to one embodiment of the invention, the multiplexer-adder level comprises a configuration register and a control logic for controlling the input multiplexer, the adder level and the output multiplexer.

A control logic controls the function of the input multiplexer, the adder level and the output multiplexer depending on a configuration stored in the configuration register. The multiplexer-adder level can be restricted by the control of the function of the input multiplexer and of the output multiplexer or the function of the adder level and of the output multiplexer. Both functions can also be used simultaneously as a combination. The configuration register stipulates which signals are output at the output of the output multiplexer. The control logic can switch off unnecessary parts of the multiplexer-adder level in order advantageously to reduce the power consumption.

The configuration can have different configurations for the different energy channels. For a first energy channel, for example, the entire information of the count values of the subpixels can be read out. For a second energy channel, for example, the total of count values can be read out. Furthermore, the outputs of the first tier of the adder level can be used as an interim result in order, for example, to enable summations of arrangements of subpixels within the macropixel, wherein the subpixels are assigned to different multiplexer-adder levels.

For example, in a macropixel with an arrangement of 4×6 subpixels, a 2×2 arrangement can be assigned to each multiplexer-adder level. In order to be able to obtain the totals of the count values of arrangements with 4×3 subpixels, the interim results of a multiplexer-adder level of a 2×2 arrangement can be used. The use of totals of the count values reduces the spatial resolution as compared with the use of the count values of the subpixels.

With the aid of the control logic of the configuration register, the spatial resolution of different energy channels can be differently selected. Advantageously, the data volume can be reduced. Advantageously, the readout and its level of detail can be adapted to the diagnostic aim. Advantageously, the energy resolution and spatial resolution can be adapted. The count values of defective or faulty detector elements can advantageously be ignored. The configuration of whether a count value of a detector element should be considered is determined in the context of calibrations and is stored in the configuration register. The number of detector elements the count values of which are taken into account or used is known.

For uses which require the calculated total of the count values of all subpixels within a macropixel, the summation can be carried out in the integrated circuit and the read-out data quantity, the readout time and the power loss can advantageously be reduced.

The number of bits for the count or the total of count values, the number of clock cycles needed per macropixel and the phase offset is determined by the number of subpixels or the subpixels contributing to a summation. In the summation, a raised count of the clock cycles relative to the number of steps is needed, since the carry must be taken along.

On readout of the total of the count values of all subpixels of a macropixel, all the adder levels of all multiplexer-adder levels in the macropixel are used. On readout of, for example, 2×2 arrangements within a macropixel with a 4×6 arrangement, all the adder levels of the multiplexer-adder levels and the input multiplexers of the further multiplexer-adder levels are used.

FIG. 1 shows an example embodiment of a concept for an X-ray detector 1 with a multi-level first multiplexer 3 in a first embodiment. The X-ray detector 1 has a plurality of detector elements 5. The detector elements 5 can be macropixels.

In this example embodiment, the number of detector elements 5 is at least 8. The dots between detector elements 5 indicate that further detector elements 5 can be present. The detector elements 5 are assigned to the first group 13. The first group 13 is subdivided into subsets with at least two elements. The at least two elements are detector elements 5. The detector elements 5 can be, for example, macropixels which are formed of a plurality of subpixels.

The multi-level first multiplexer 3 has a plurality of levels and in the present example, the first level 11, a further level 23 and a last level 21. The multi-level first multiplexer 3 has a plurality of inputs 15 and one output 17. The inputs 15 of the multi-level first multiplexer 3 correspond to the inputs 15 of the first level 11. Each detector element 5 of the first group 13 is assigned to an input 15 of the first level 11 or equally, an input 15 of the multi-level first multiplexer 3. Each subset is assigned to a multiplexer unit 9 of the first level 11. Each element is assigned to one input 15 of the multiplexer unit 9 of the multi-level multiplexer 3.

The first level 11 has a number of inputs 15 which corresponds to the number of detector elements 5. In the present example, the first level 11 forms the lowest hierarchy level. The first level 11 is assigned the greatest number of inputs 15.

Each multiplexer unit 9 of the multi-level first multiplexer 3 can be assigned to an output 17. Each multiplexer unit 9 comprises, for example, at least two inputs 15 and one output 17. The number of the signal lines can be reduced accordingly by at least one factor of 2. The first level 11 comprises, in the present example, four multiplexer units 9. In further embodiments, the first level 11 can also have more (or fewer) multiplexer units. The outputs 17 of at least two multiplexer units 9 of the first level are assigned to the inputs 15 of one multiplexer unit 9 of the further level 23. The further level 23 can comprise at least two multiplexer units 9. The outputs of at least two multiplexer units 9 of the further level 23 are assigned to the inputs 15 of the multiplexer unit 9 of the last level 21. The last level 21 comprises a multiplexer unit 9. The output 17 of the multiplexer unit 9 or of the last level 21 is the output 17 of the multi-level first multiplexer 3. The output 17 of the multiplexer unit 9 or of the last level 21 is assigned to the serial output 19.

The total number of the inputs 15 of the first level 11 of the multi-level first multiplexer 3 is greater than the total number of the outputs 17 of the first level 11 of the multi-level first multiplexer 3. The total number of the inputs 15 of the further level 23 of the multi-level first multiplexer 3 is greater than the total number of the outputs 17 of the first level 23 of the multi-level first multiplexer 3. The total number of the inputs 15 of the further level 21 of the multi-level first multiplexer 3 is greater than the total number of the outputs 17 of the last level 21 of the multi-level first multiplexer 3.

A serial output 19 is assigned to the output 17 of the last level 21 of the multi-level first multiplexer 3. The first level 11, the further level 23 and the last level 21 have at least two inputs 15. The first level 11, the further level 23 and the last level 21 have at least one output 17. The further level 23 has a reduced total number of the inputs 15 and a reduced total number of the outputs 17 as compared with the first level 11. With the further level 23, the hierarchy level of the arrangement of the detector elements 5 increases, for example, from macropixels 29 to columns of macropixels 29.

The first level 11, the further level 23 and the last level 21 can comprise a tree-like or hierarchical structure with multiplexer units 9. The hierarchically lowest level or the leaves of a tree are assigned to the first level 11 of the multi-level first multiplexer 3. The further level 23 leads to a hierarchically higher level or coarser branching. The last level 21 is assigned to the serial output 19. The last level 21 represents the highest hierarchical level or the trunk of the tree.

By way of the readout architecture of the evaluation logic with the multi-level first multiplexer 3, the speed of the switching or the clock rate to lower levels of the multi-level first multiplexer 3 can advantageously be reduced. The serial output 19 or the last level 21 is operated at the full clock rate. The clock rate of the lower hierarchy levels of the multi-level first multiplexer 3 can be reduced, for example, by assigning the levels to quadrants, macropixel columns, macropixels 29.

A single clock rate can be distributed to all levels of the multi-level first multiplexer 3, wherein the single clock rate in the first level 11 and the further level 23 can be reduced, for example, by multipliers close to the multiplexer units 9. Alternatively, clock rates adapted to the first level 11, the further level 23 and the last level 21 can be distributed, wherein the adapted clock rate is provided, for example, at one site and is distributed from there.

Advantageously, the power loss can be reduced. Advantageously, the crosstalk due to the readout process as a result of the low clock frequency in the hierarchically lower levels can be reduced or avoided. Advantageously, fewer or weaker drivers can be used for transporting the data via the integrated circuit to the serial output 19. The readout architecture is particularly energy and space efficient. The number of signal lines can be reduced. The crosstalk of digital signals onto the analog front end of the readout logic is reduced.

Figure 2:
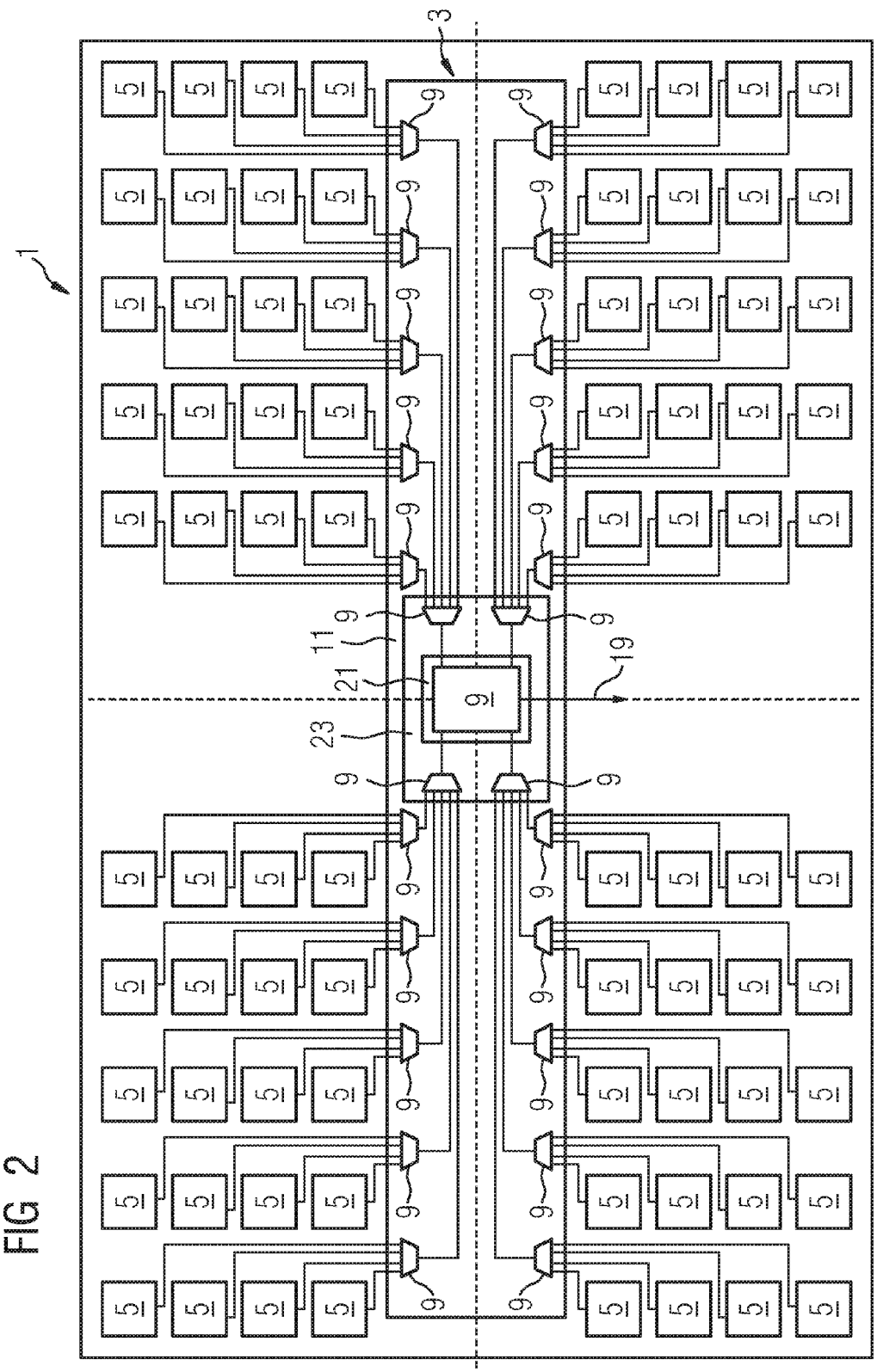
FIG. 2 is a schematic representation of an X-ray detector according to a further embodiment with a multi-level first multiplexer.

FIG. 2 shows an example embodiment of an X-ray detector 1 with a multi-level first multiplexer 3 in a further configuration. The X-ray detector 1 has 80 detector elements 5. The detector elements 5 can be macropixels 29.

The arrangement of the detector elements 5 is subdivided into 10 columns and 8 rows. The arrangement of the detector elements 5 is subdivided into four equal-sized quadrants. Each quadrant contains 20 detector elements 5. The detector elements 5 are subdivided within the quadrants into 5 columns and 4 rows. Situated in each column within the quadrants are 4 detector elements 5.

The multi-level first multiplexer 3 has a first level 11, a further level 23 and a last level 21. The first level 11 comprises 20 multiplexer units 9. Each multiplexer unit 9 of the first level 11 comprises four inputs 15 and one output 17. The further level 23 comprises four multiplexer units 9. Each multiplexer unit 9 of the further level 23 comprises five inputs 15 and one output 17. The last level 21 comprises one multiplexer unit 9.

The one multiplexer unit 9 of the last level 21 comprises four inputs 15 and one output 17. The output 17 of the one multiplexer unit 9 of the last level 21 corresponds to the output 17 of the last level 21. The output 17 of the last level 21 is assigned to the serial output 19. The last level 21, the one multiplexer unit 9 of the last level 21 or the serial output 19 is operated at the full clock rate. The further level 23 or the multiplexer units 9 of the further level 23 are operated at a clock rate reduced by the factor four as compared with the full clock rate. The factor four for reduction is given by the number of multiplexer units 9 in the further level 23.

The first level 11 or the multiplexer units 9 of the first level 11 are operated at a clock rate reduced by the factor 20 as compared with the full clock rate. The factor 20 for reduction is given by the number of multiplexer units 9 in the further level 23 multiplied by the number of multiplexer units 9 in the first level 11. The detector elements 5 are operated at a clock rate reduced by the factor 80 as compared with the full clock rate. The factor 80 for reduction is given by the number of multiplexer units 9 in the further level 23 multiplied by the number of multiplexer units 9 in the first level 11 multiplied by the number of detector elements 5 which are assigned to one multiplexer unit 9 of the first level 11.

Figure 3:
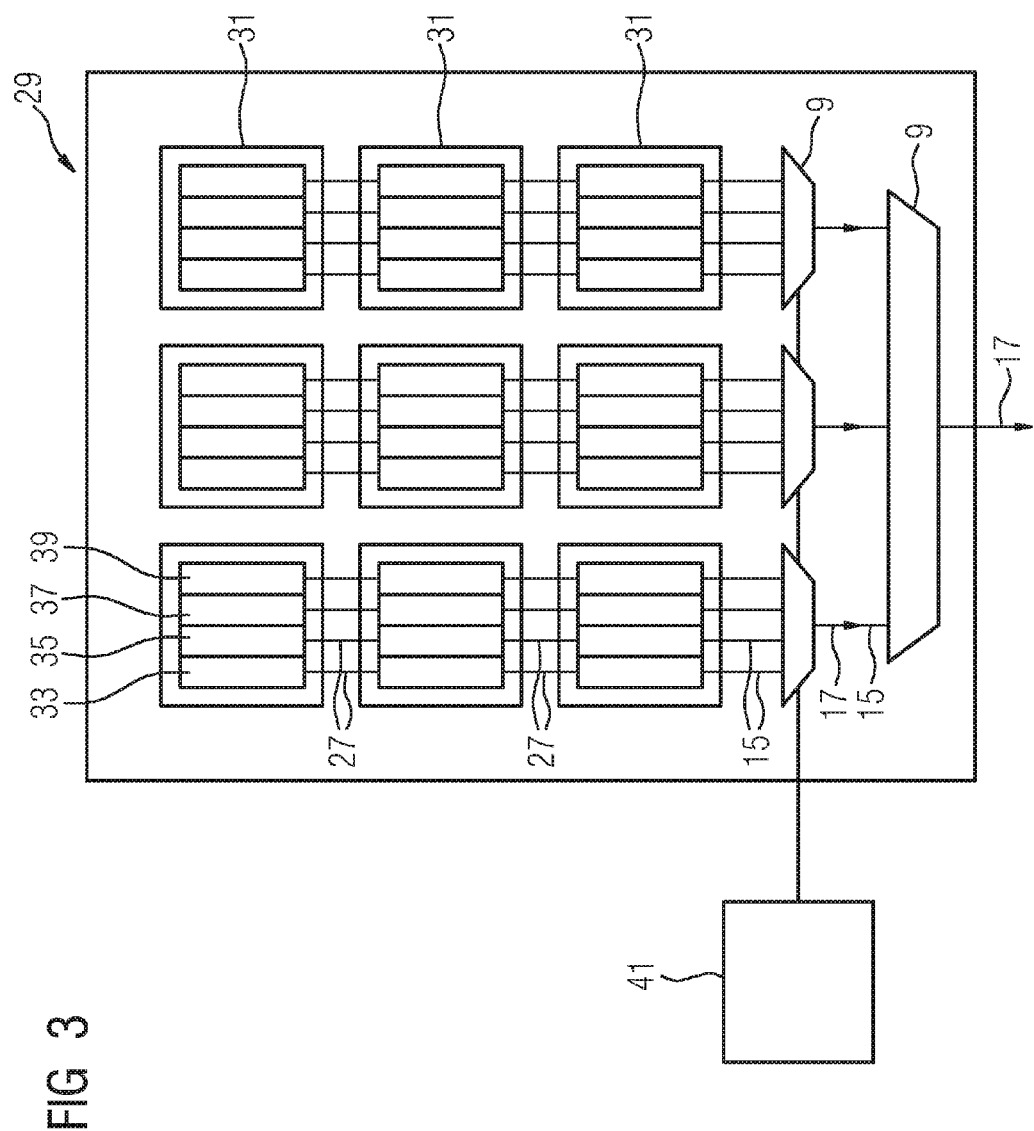
FIG. 3 is a schematic representation of a macropixel with shift registers.

FIG. 3 shows an example embodiment of a macropixel 29 with shift registers. The macropixel 29 has 9 subpixels 31. The subpixels 31 are arranged in 3 columns and 3 rows. The subpixels comprise a plurality of discriminators. Each subpixel 31 has a first energy channel 33, a second energy channel 35, a third energy channel 37 and a fourth energy channel 39.

The energy channels 33, 35, 37, 39 can be arranged ascendingly such that the first energy channel 33 is assigned to the energetically lowest discriminator and the fourth energy channel 39 is assigned to the energetically highest discriminator. The discriminators can be constructed as one-sided or two-sided discriminators. Within one column, the first energy channels 33 of the individual subpixels 31 or the register of the first energy channels 33 of the individual subpixels 31 are connected via signal lines 27.

The count registers of the first energy channels 33 are configured as shift registers. The same applies for the second energy channel 35, the third energy channel 37 and the fourth energy channel 39. The count values from the count registers or energy channels 33, 35, 37, 39 of the individual subpixels within a column are conducted from above downwardly into the input 15 of the multiplexer unit 9.

The multiplexer unit 9 which is assigned to a column groups the signals or data streams of the energy channels 33, 35, 37, 39 of one column together. The three columns each have a multiplexer unit 9. The outputs 17 of the multiplexer units 9, each being assigned to a column, are assigned to the inputs of a further multiplexer unit 9. The further multiplexer unit 9 groups the signals or data streams of the three columns together. The output 17 of the further multiplexer unit 9 can be assigned, for example, to an input of a multiplexer unit 9 of the first level 11 of a multi-level first multiplexer 3 in FIG. 2. A control logic 41 can ignore individual subpixels 31 or energy channels 33, 35, 37, 39.

The subpixels 31 and the multiplexer units 9 which are assigned to a column can be operated at a clock rate reduced by the factor 240 as compared with the full clock rate. The factor 240 for reduction is given by the number of multiplexer units 9 in the further level 23 multiplied by the number of multiplexer units 9 in the first level 11 multiplied by the number of detector elements 5 which are assigned to one multiplexer unit 9 of the first level 11, multiplied by the number of columns within the macropixel 29.

Figure 4:
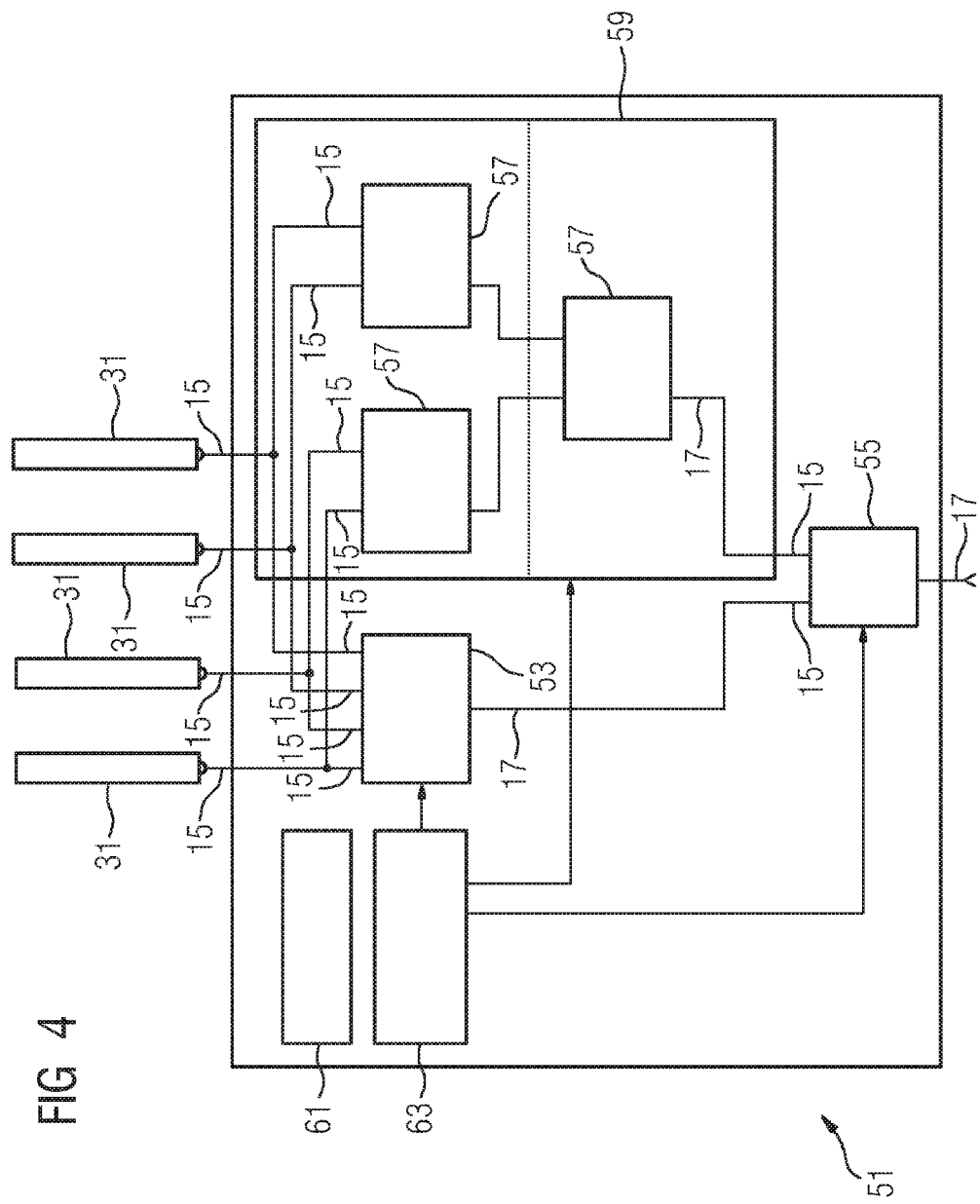
FIG. 4 is a schematic representation of a multiplexer-adder level.

FIG. 4 shows an example embodiment of a multiplexer-adder level 51. The macropixel 29 has at least one multiplexer-adder level. The multiplexer-adder level is a combination of multiplexers or multiplexer units 9 and full adders with carry 57.

The multiplexer-adder level 51 can comprise a plurality of inputs 15 and one output 17. The multiplexer-adder level 51 comprises an input multiplexer 53, an adder level 59 and an output multiplexer 55. The input multiplexer 53 can comprise four inputs 15 and one output 17. The data streams of the inputs 15 are emitted by the output 17 of the input multiplexer as one data stream. The adder level 59 can comprise four inputs 15 and one output 17. The data streams of the inputs 15 are emitted by the output 17 as one data stream. The adder level 59 comprises three full adders with carry. Incoming data streams or bit streams can be added bit-by-bit.

The result can be output with the aid of the output multiplexer 55 to the subsequent level, for example, a further multiplexer-adder level 51 or as the input 15 into the multi-level first multiplexer 3. The input multiplexer 53 and the adder level 59 can be operated in parallel and can both have the same data streams as the input 15. The output multiplexer 55 can output the data streams of the input multiplexer 53 or the adder level 59.

The adder level 59 comprises two tiers. The multiplexer-adder level 51 can have a hierarchical structure. The output 17 of the input multiplexer 53 and the output 17 of the adder level 59 can be an input 15 of the output multiplexer 55. The adder level 59 can comprise two hierarchy levels, wherein the inputs 15 of the adder level 59 can be distributed over two full adders with carry 57 and the outputs 17 of the two full adders with carry 57 can be the inputs 15 of a further full adder with carry 57. The two full adders with carry 57 form the first tier. The further full adder with carry 57 forms the second tier. Between the first tier and the second tier, the signals of the outputs 17 of the two full adders with carry 57 can be branched off and further used differently.

Four subpixels 31 of the macropixel 29 are assigned to a second group. Each subpixel 31 of the second group can be assigned to an input 15 of the input multiplexer 53 or an input 15 of the adder level 59. Within a macropixel 29, the subpixels 31 can be assigned to a second group. Each subpixel 31 of the second group can be assigned to an input 15 of the input multiplexer 53 or an input 15 of the adder level 59.

The set of all subpixels 31 of a macropixel 29 can be divided into subsets which are preferably equally large, for example four subpixels 31. Each subset is assigned to a multiplexer-adder level 51 within the macropixel 29. Each subpixel 31 of the subgroup is assigned to an input 15 of a multiplexer-adder level 51 within the macropixel 29. Each multiplexer-adder level 51 within the macropixel 31 can be assigned an output 17.

Each multiplexer-adder level 51 can comprise, for example, four inputs 15 and one output 17. The number of signal lines can advantageously be reduced by a factor of four. The output 17 of the input multiplexer 53 or the output 17 of the adder level 59 is assigned to the output multiplexer 55. The output multiplexer 55 has a first input 15 which is connected to the output 17 of the input multiplexer 53 and the output multiplexer 55 has a second input 15 which is connected to the output 17 of the adder level 59. The output multiplexer 55 can output the signals of the first input 15 or of the second input 15, for example as a combination. The signals or count values, for example, of the subpixels 31 or of regions of the macropixel 29 can advantageously be read out and added flexibly.

The output 17 of a multiplexer-adder level 51 is assigned to an input 15 of a further input multiplexer 53 or an input 15 of a further adder level 59. The multiplexer-adder level 51 can adjoin a further multiplexer-adder level 51 (not shown). Advantageously, the signals of the subpixels 31 can be combined with one another within a macropixel 29. The multiplexer-adder level 51 comprises a configuration register 61 and a control logic 63 for controlling the input multiplexer 53, the adder level 59 and the output multiplexer 55.

The control logic 63 controls the function of the input multiplexer 53, the adder level 59 and the output multiplexer 55 depending on a configuration stored in the configuration register 61. The control logic 63 can switch off unnecessary parts of the multiplexer-adder level 51 in order advantageously to reduce the power consumption. The configuration can comprise different configurations for the different energy channels 33, 35, 37, 39. For the first energy channel 33, for example, the entire information of the count values of the subpixels 31 can be read out. For the second energy channel 35, for example, the total of count values can be read out.

Figure 5:
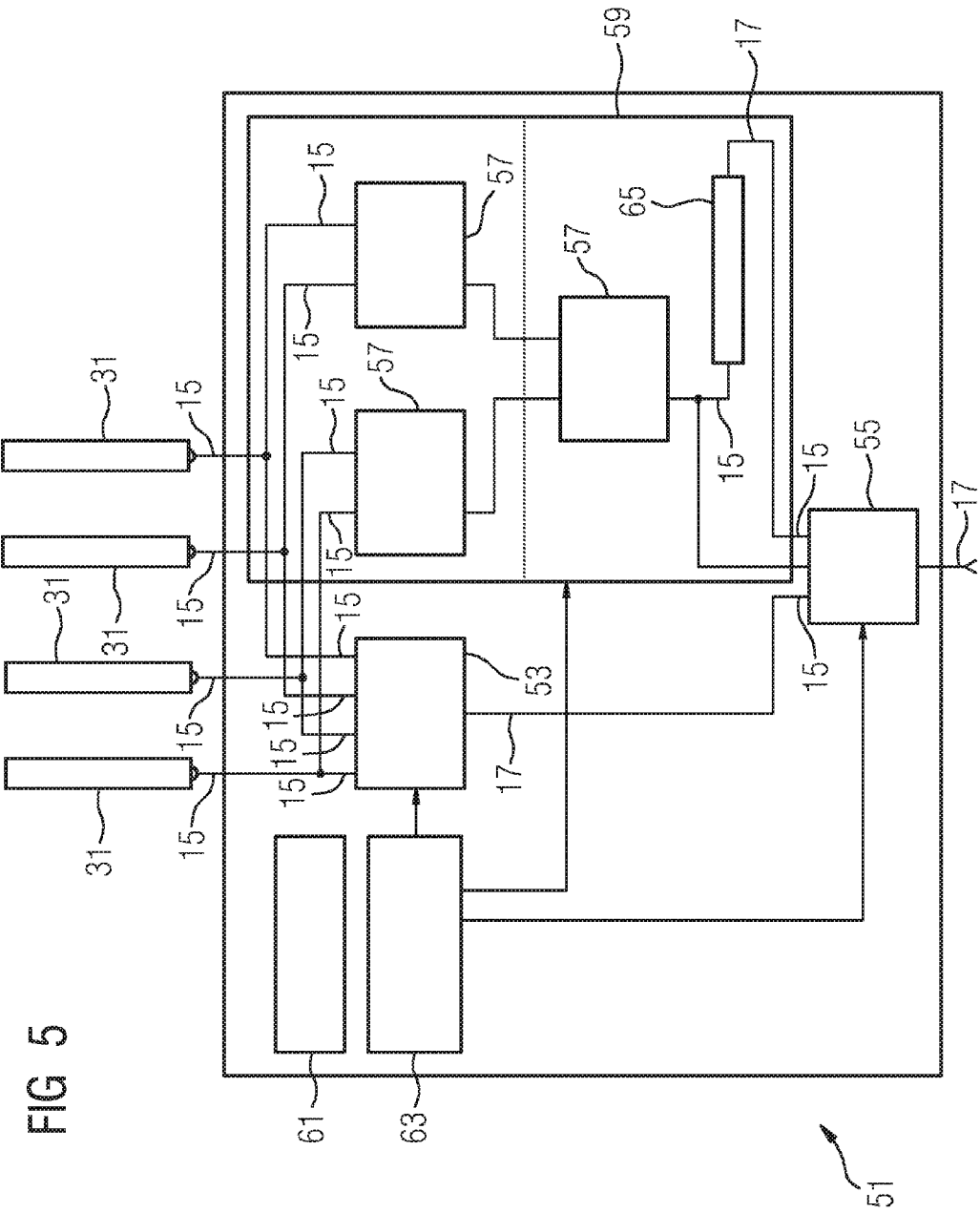
FIG. 5 is a schematic representation of a multiplexer-adder level with a sum memory.

FIG. 5 shows an example embodiment of a multiplexer-adder level 51 with a sum memory 65. The adder level 59 has a sum memory 65 which is assigned to the input 15 of the further input multiplexer 53 (not shown), the input 15 of the further adder level 59 (not shown) or the output multiplexer 55. The adder level 59 can comprise a sum memory 65 which can serve as an intermediate memory store for a calculated total. The input 15 of the sum memory 65 is connected to the output 17 of the further full adder with carry 57.

The output 17 of the sum memory 65 is connected to the output 15 of the output multiplexer 55. Advantageously, the signals can be added together with the aid of the input multiplexer 53 to a signal with full information of the count values of the subpixels 31, whereas the total of the count values can be calculated and stored. The stored total can be appended, for example, to the data stream with full information regarding the count values of the subpixels 31. Advantageously, the entire information of the count values of the subpixels 31 and the calculated total are available for the evaluation of the signals. The data stream can contain the count values of the subpixels 31 and the total of count values.

Figure 6:
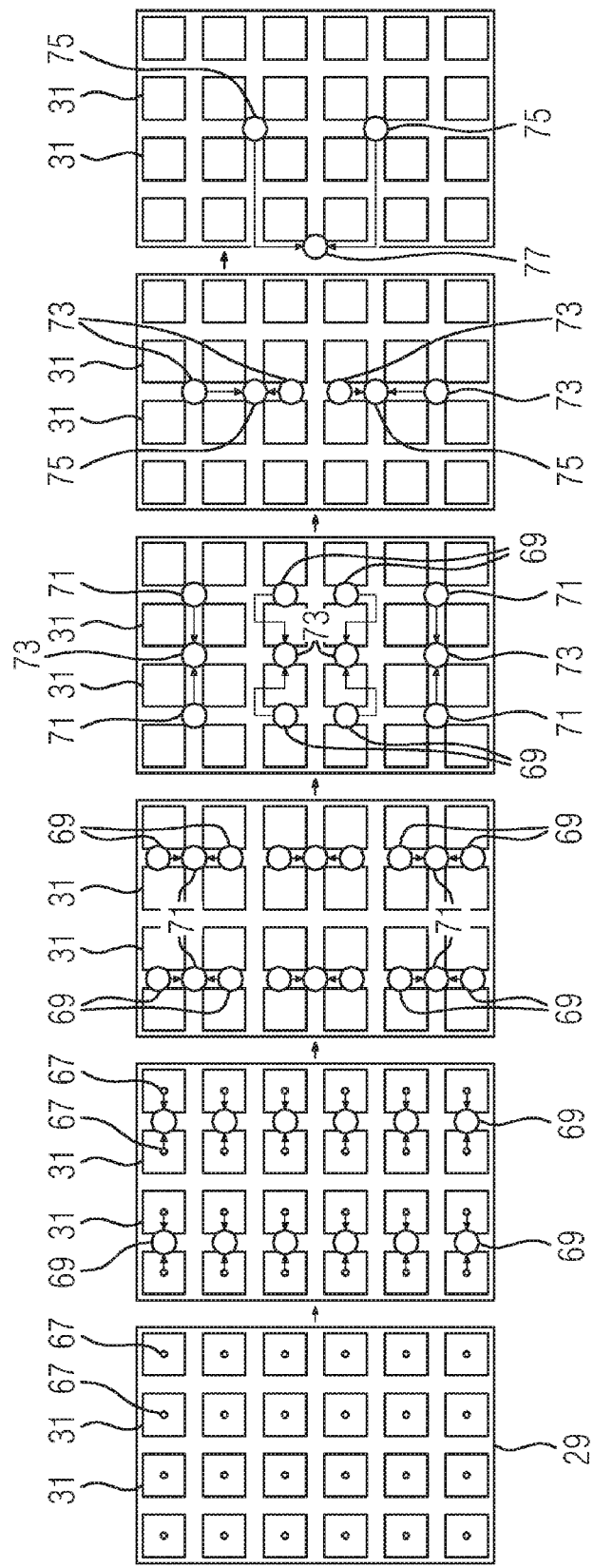
FIG. 6 is a schematic representation of a summation scheme within a macropixel with a plurality of multiplexer-adder levels.

FIG. 6 shows an example embodiment of a summation scheme within a macropixel 29 with a plurality of multiplexer-adder levels 51. The macropixel 29 contains 24 subpixels 31 which are arranged in 4 columns and 6 rows and correspond to a 4×6 arrangement. Pixel groups with a 2×2, 4×3 or 4×6 arrangement can be formed. The subpixels in the rows 3 and 4 are situated in the same pixel group with a 2×2 arrangement and in different pixel groups with a 4×3 arrangement.

In a first step, each subpixel has at least one count value 67. The count values 67 are assigned to the inputs 15 of the multiplexer-adder levels 51. A multiplexer-adder level 51 is assigned to each 2×2 arrangement. A further multiplexer-adder level 51 is assigned to each 4×3 arrangement.

In a second step, a first total 69 of the count values 67 is formed from two adjacent subpixels 31 in each case. The first total 69 is a total of the count values of two subpixels 31 in a 2×1 arrangement. The first total 69 is formed in the full adders with carry 57 of the first tier of the adder level 59 of the multiplexer-adder level 51.

In a third step, a second total 71 is formed from two adjacent first totals 69. The second total 71 is a total of the count values of four subpixels 31 in a 2×2 arrangement. The second total 71 is formed in the full adders with carry 57 of the second tier of the adder level 59 of the multiplexer-adder level 51.

In a fourth step, a third total 73 of two adjacent second totals 71 is formed, or a third total 73 from two adjacent first totals 69. From top to bottom, a third total 73 as a total of the count values 67 of eight subpixels 31 in a 4×2 arrangement, a total of the count values 67 of four subpixels 31 in a 4×1 arrangement, a further total of the count values 67 of four subpixels 31 in a 4×1 arrangement and a total of the count values 67 of eight subpixels 31 in a 4×2 arrangement is calculated. The third total 73 is formed in the full adders with carry 57 of the first tier of the adder level 59 of the further multiplexer-adder level 51. The inputs 15 of the further multiplexer-adder level 51 is herein to the output 17 of the upper and lower multiplexer-adder level 51 and also with the interim results of the first tier of the multiplexer-adder levels 51 according to the assignment to an upper and lower 4×3 arrangement. The interim results of the row 3 is assigned to the input 15 of the upper further multiplexer-adder level 51 and the interim results of the row 4 are assigned to the lower further multiplexer-adder level 51.

In a fifth step, a fourth total 75 of two adjacent third totals 73 is formed. The fourth total 75 is a total of the count values 67 of twelve subpixels 31 in a 4×3 arrangement. The fourth total 75 is formed in the full adders with carry 57 of the second tier of the adder level 59 of the further multiplexer-adder level 51.

In a sixth step, a fifth total 77 is formed from two adjacent fourth totals 75. The fifth total 77 is a total of the count values 67 of 24 subpixels in a 4×6 arrangement. Two inputs which are connected to the two outputs 17 of the further multiplexer-adder level 51 are assigned to a further adder. The output of the further adder is assigned to the output 17 of the macropixel 29. The summation scheme can be used for subpixels 31 with a first energy channel 33 or further energy channels, for example, a second energy channel 35, a third energy channel 37 or a fourth energy channel 39. The count values of the different energy channels 33, 35, 37, 39 are processed sequentially.

With the aid of the configuration register 61 and the configuration logic 63, the summation of the count values 67 for the different energy channels 33, 35, 37, 39 up to one of the steps first step, second step, third step, fourth step, fifth step or sixth step can be carried out. This enables influencing of the spatial resolution of an energy channel, the data volume or the dynamic region of the imaging representation. In addition, defective or faulty subpixels 31 can be ignored with the aid of the configuration register 61.

Figure 7:
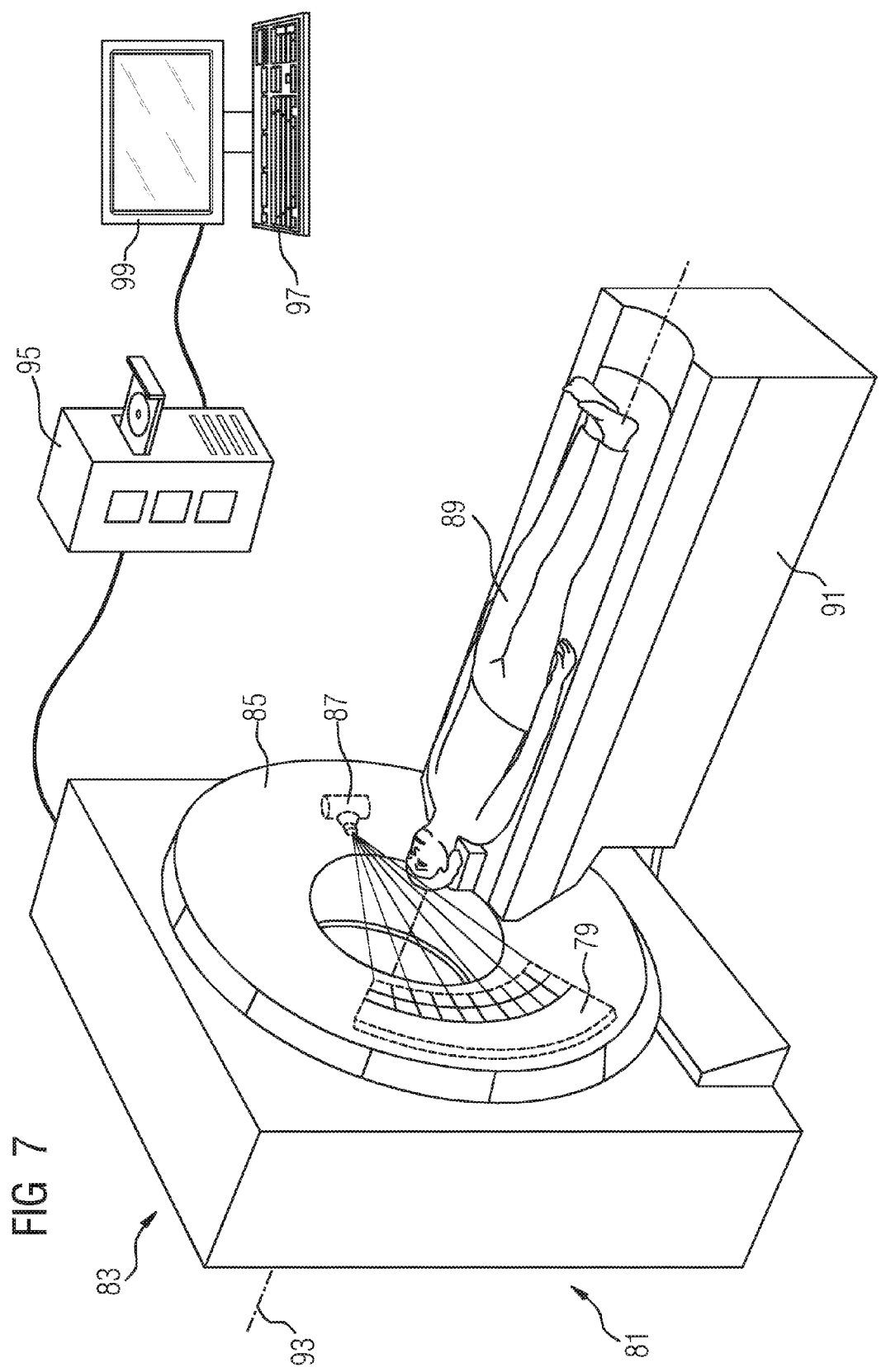
FIG. 7 is a schematic representation of a computed tomography apparatus.

FIG. 7 shows an example embodiment of a computed tomography apparatus 81 according to the invention with a detector apparatus 79 according to the invention. The detector apparatus 79 has the X-ray detector 1 according to an embodiment of the invention. The detector apparatus 79 can comprise modules which have at least one X-ray detector 1, for example modules and X-ray detectors 1 which can be tiled. The computed tomography apparatus 81 comprises a gantry 83 with a rotor 85. The rotor 85 comprises an X-ray source 87 and the detector apparatus 79 according to an embodiment of the invention. The patient 89 is positioned on the patient support 91 and is movable along the rotation axis z 93 through the gantry 83. In order to control and calculate the sectional images, a computer unit 95 is used. An input device 97 and an output apparatus 99 are connected to the computer unit 95.

Although the invention has been disclosed in detail with the preferred example embodiment, the invention is not restricted by the examples given and other variations can be derived therefrom by a person skilled in the art without departing from the protective scope of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An X-ray detector, comprising
    an arrangement of detector elements; and
    an evaluation logic of the arrangement of detector elements, the evaluation logic including a multi-level first multiplexer, wherein
        a plurality of the detector elements are assigned to a first group,
        each of the plurality of detector elements of the first group is assigned to an input of a first level of the multi-level first multiplexer,
        a total number of the inputs of levels of the multi-level first multiplexer is greater than a total number of outputs of levels of the multi-level first multiplexer, and
        a serial output is assigned to an output of a relatively last level of the multi-level first multiplexer.

2. The X-ray detector of claim 1, wherein the detector elements are configured to carry out energy-selective measurements.

3. The X-ray detector of claim 2, wherein the detector elements are each a subpixel of a macropixel.

4. The X-ray detector of claim 2, wherein the detector elements are each a macropixel which comprise a plurality of subpixels.

5. The X-ray detector of claim 4, wherein a plurality of subpixels of the macropixel are assigned to a second group and wherein the X-ray detector also includes a shift register for readout of the second group of subpixels.

6. The X-ray detector of claim 5, wherein the macropixel includes at least one multiplexer-adder level.

7. The X-ray detector of claim 6, wherein the at least one multiplexer-adder level includes an input multiplexer, an adder level and an output multiplexer.

8. The X-ray detector of claim 7, wherein the adder level comprising two tiers.

9. The X-ray detector of claim 4, wherein the macropixel includes at least one multiplexer-adder level.

10. The X-ray detector of claim 9, wherein the at least one multiplexer-adder level includes an input multiplexer, an adder level and an output multiplexer.

11. The X-ray detector of claim 10, wherein the adder level comprising two tiers.

12. A medical apparatus comprising the X-ray detector of claim 2.

13. The X-ray detector of claim 1, wherein the detector elements are each a subpixel of a macropixel.

14. A medical apparatus comprising the X-ray detector of claim 13.

15. The X-ray detector of claim 1, wherein the detector elements are each a macropixel which comprise a plurality of subpixels.

16. The X-ray detector of claim 15, wherein a plurality of subpixels of the macropixel are assigned to a second group and wherein the X-ray detector also includes a shift register for readout of the second group of subpixels.

17. The X-ray detector of claim 15, wherein the macropixel includes at least one multiplexer-adder level.

18. The X-ray detector of claim 17, wherein the at least one multiplexer-adder level includes an input multiplexer, an adder level and an output multiplexer.

19. The X-ray detector of claim 18, wherein the adder level comprising two tiers.

20. The X-ray detector of claim 18, wherein a plurality of subpixels of the macropixel are assigned to a second group and wherein each subpixel of the second group is assigned to an input of the input multiplexer or an input of the adder level.

21. The X-ray detector of claim 18, wherein the output of the input multiplexer and the output of the adder level is assigned to the output multiplexer.

22. The X-ray detector of claim 18, wherein the output of a multiplexer-adder level is assigned to an input of a further input multiplexer or an input of a further adder level.

23. The X-ray detector of claim 22, wherein the adder level comprises a sum memory, assigned to the input of the further input multiplexer, the input of the further adder level or the output multiplexer.

24. The X-ray detector of claim 18, wherein the at least one multiplexer-adder level comprises a configuration register and a control logic for controlling the input multiplexer, the adder level and an output multiplexer.

25. A medical apparatus comprising the X-ray detector of claim 15.

26. A medical apparatus comprising the X-ray detector of claim 1.

* * * * *